United States Patent [19]
Flores, Jr. et al.

[11] Patent Number: 6,155,417
[45] Date of Patent: Dec. 5, 2000

[54] DISC STORAGE CONTAINER WITH RETAINING MEANS

[75] Inventors: Victorio T. Flores, Jr., Rancho Palos Verdes; Victorio M. Flores, III, San Pedro; Ernst C. Benjamins, Covina, all of Calif.

[73] Assignee: Filam National Plastics, Gardena, Calif.

[21] Appl. No.: 09/277,449

[22] Filed: Mar. 26, 1999

[51] Int. Cl.⁷ .................................................. B65D 85/57
[52] U.S. Cl. ........................................ 206/308.1; 206/310
[58] Field of Search ................................ 206/308.1, 310, 206/804

[56] References Cited

U.S. PATENT DOCUMENTS

| | | |
|---|---|---|
| D. 369,712 | 5/1996 | Sankey et al. . |
| D. 387,217 | 12/1997 | Lakoski et al. . |
| 4,722,439 | 2/1988 | Grobecker et al. . |
| 4,747,484 | 5/1988 | Ackeret . |
| 4,771,883 | 9/1988 | Herr et al. . |
| 4,895,252 | 1/1990 | Nomula et al. .................. 206/308.1 X |
| 4,899,875 | 2/1990 | Herr et al. . |
| 4,964,510 | 10/1990 | Loyd . |
| 5,205,401 | 4/1993 | Weisburn et al. . |
| 5,211,283 | 5/1993 | Weisburn et al. . |
| 5,259,498 | 11/1993 | Weisburn et al. . |
| 5,279,097 | 1/1994 | Weisburn et al. . |
| 5,284,243 | 2/1994 | Gelardi et al. . |
| 5,390,515 | 2/1995 | Essick . |
| 5,445,265 | 8/1995 | Herr et al. . |
| 5,533,615 | 7/1996 | McCamy . |
| 5,551,560 | 9/1996 | Weisburn et al. . |
| 5,573,120 | 11/1996 | Kaufman et al. . |
| 5,574,716 | 11/1996 | Uchida . |
| 5,584,391 | 12/1996 | Weisburn . |
| 5,590,768 | 1/1997 | Hilton et al. . |
| 5,597,068 | 1/1997 | Weisburn et al. . |
| 5,615,779 | 4/1997 | Marsilio et al. . |
| 5,682,991 | 11/1997 | Lammerant et al. . |
| 5,690,218 | 11/1997 | McCamy et al. . |
| 5,713,463 | 2/1998 | Lakoski et al. . |
| 5,762,187 | 6/1998 | Belden, Jr. et al. . |
| 5,779,038 | 7/1998 | Herr et al. . |
| 5,782,350 | 7/1998 | Weisburn et al. . |
| 5,788,068 | 8/1998 | Fraser et al. . |
| 5,794,796 | 8/1998 | Weisburn . |
| 5,816,394 | 10/1998 | O'Brien et al. . |
| 5,829,582 | 11/1998 | Ippolito et al. ...................... 206/308.1 |
| 5,829,583 | 11/1998 | VerWeyst et al. . |
| 5,842,563 | 12/1998 | Herr et al. . |
| 5,938,020 | 8/1999 | Luckow .............................. 206/308.1 |

FOREIGN PATENT DOCUMENTS

| | | |
|---|---|---|
| WO96/14636 | 5/1996 | WIPO . |
| WO97/41563 | 11/1997 | WIPO . |

*Primary Examiner*—Bryan P. Gehman
*Attorney, Agent, or Firm*—Christie, Parker & Hale, LLP

[57] ABSTRACT

A storage container for optical discs has a tray configured to receive a disc and a plurality of retainers formed upon the tray. The retainers are configured so as to capture a disc upon the tray and so as to facilitate insertion of the disc onto the tray from above. In this manner, loading of the tray with the disc may easily be automated.

20 Claims, 5 Drawing Sheets

DISC STORAGE CONTAINER WITH RETAINING MEANS

FIELD OF THE INVENTION

The present invention relates generally to storage containers. The present invention relates more particularly to a storage container which is configured to store an optical disc, such as a CD, CD-ROM, CD-R, CD-RW, DVD, DVD-R, DVD-RAM or the like. The storage container of the present invention is configured to mitigate the application of undesirable stresses to the disc as it is inserted and removed therefrom. The storage container is also configured so as to facilitate machine loading thereof.

BACKGROUND OF THE INVENTION

Optical discs such as CDs, CD-ROMs, CD-Rs, CD-RWs, DVDs, DVD-Rs, DVD-RAMs and the like are well known. Such optical discs are commonly stored within a protective container. The protective container prevents the optical disc from being scratched or otherwise damaged during shipping, handling and storage thereof.

As those skilled in the art will appreciate, optical discs are subject to being damaged by mishandling thereof. Although the bottom surface of such optical discs comprises a layer of polycarbonate or the like which has a thickness of approximately 0.050 inch (and which is thus comparatively durable and resistant to physical damage), the top surface of such optical discs comprises an extremely delicate aluminum film which typically has a thickness of only approximately 1 micron.

The delicate aluminum surface on the top of contemporary optical discs is therefore undesirably susceptible to physical damage. Scratching or other damage to this thin aluminum film often results in damage to the data, e.g., computer program, computer data, audio data, video data or the like stored upon the optical disc. Although data is typically stored upon such optical discs in a manner which readily facilitates recovery of lost portions thereof due to such physical damage to the media, it is still possible to damage the aluminum film such that data is permanently lost. It is even possible to damage the optical disc sufficiently that it becomes completely unusable.

Thus, protective storage containers are frequently utilized to facilitate shipping, handling, and storage of such optical discs. The storage containers protect the optical discs from physical damage which might otherwise occur.

Although such contemporary protective storage containers for optical discs and the like have proven generally suitable for their intended use, contemporary storage containers suffer from inherent deficiencies which detract from their overall effectiveness and desirability. For example, contemporary storage containers require that an optical disc be removed therefrom by pulling the optical disc upwardly at the periphery thereof, while pushing downwardly upon a central attaching hub of the storage container, so as to free the optical disc from the hub. Such pulling up at the periphery of the optical disc causes the optical disc to deform or bend substantially, thereby introducing substantial stresses into the optical disc.

The introduction of such stresses is particularly undesirable for multi-layer optical discs, such as those used in the production of high density DVDs and the like. Multi-layer optical discs are rapidly becoming popular because of the ability to store large amounts of data, such as video programming, thereon.

As those skilled in the art will appreciate, the introduction of such undesirable stresses into multi-layer discs may cause the plural layers of the disc to delaminate as the shear strength of the bonding agent used to attach adjacent layers to one another is exceeded. Such delamination will, of course, result in the destruction of the disc, rendering it completely useless.

Thus, it is desirable to provide a storage container which is configured to store an optical disc, such as a CD, CD-ROM, CD-R, CD-RW, DVD, DVD-R, DVD-RAM or the like, which mitigates the undesirable introduction of stresses into the optical disc when it is placed within the storage container (both during an initial machine placement of the optical disc within the storage container and during subsequent user placement of the optical disc therein) and when the optical disc is removed from the storage container.

It is further desirable that the storage container be easy and convenient to use. Thus, placement of the optical disc within the storage container and removal of the optical disc therefrom must be easily and conveniently accomplished by the user.

It is further desirable that the storage container facilitate automated or machine based manufacturing techniques, wherein a machine arm, pusher or the like is used to place an optical disc within the storage container in a rapid and efficient manner.

SUMMARY OF THE INVENTION

The present invention specifically addresses and alleviates the above-mentioned deficiencies associated with the prior art. The present invention comprises a tray configured to receive a disc and a plurality of retainers formed upon the tray. The retainers are configured so as to capture the disc upon the tray and so as to facilitate insertion of the disc onto the tray from above. By configuring the retainers so as to facilitate insertion of a disc onto the tray from above, machine loading of the tray with a disc by the manufacturer or producer is facilitated.

According to the preferred embodiment of the present invention, the tray further comprises a release button which facilitates easy installation and removal of the disc while mitigating the application of undesirable stresses to the disc which might otherwise result in delamination or other damage to the disc.

Further, according to the preferred embodiment of the present invention, the disc is supported only about an unrecorded periphery thereof, so as to mitigate the potential for damaging the recorded portion of the disc.

DESCRIPTION OF THE DRAWINGS

These and other features, aspects, and advantages of the present invention will be more fully understood when considered with respect to the following detailed description, appended claims, and accompanying drawings, wherein:

DETAILED DESCRIPTION OF THE INVENTION

The detailed description set forth below in connection with the appended drawings is intended as a description of the presently preferred embodiment of the invention and is not intended to represent the only form in which the present invention may be constructed or utilized. The detailed description sets forth the construction and functions of the invention, as well as the sequence of steps for operating the invention in connection with the illustrated embodiment. It is to be understood, however, that the same or equivalent functions may be accomplished by different embodiments which are also intended to be encompassed within the spirit and scope of the invention.

The disc storage container of the present invention is illustrated in FIGS. 1–9 which depict the presently preferred embodiment thereof.

As used herein, the term "disc" is defined to include any compact disc (CD), compact disc read only memory (CD-ROM), recordable compact disc (CD-R), rewriteable compact disc (CD-RW), digital video disc or digital versatile disc (DVD), recordable digital video disc or recordable digital versatile disc (DVD-R), digital video disc random access memory or digital virtual disc random access memory (DVD-RAM), as well as any other similar device which is used for storing information.

Figure 1:
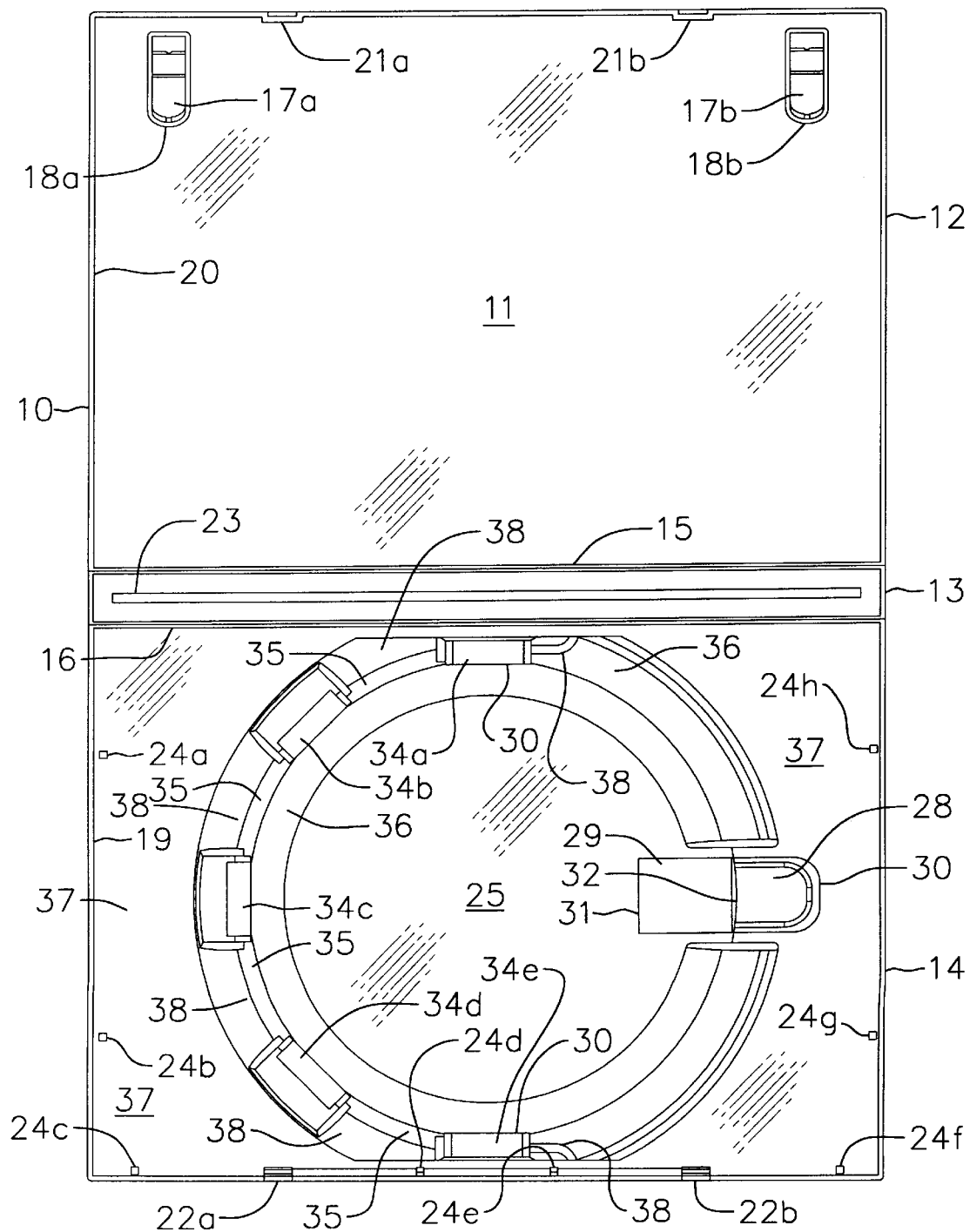
FIG. 1 is a plan view of the disc storage container of the present invention opened to show the tray thereof.

Referring now to FIG. 1, the disc storage container generally comprises a housing 10 having a cover or upper housing section 12 and a lower housing section 14. The upper housing section 12 is preferably attached to the lower housing section 14 via a hinge panel 13 which is attached to the upper housing section 12 via first living hinge 15 and which is attached to the lower housing section 14 via second living hinge 16. Those skilled in the art will appreciate various other means for attaching the upper housing section 12 to the lower housing section 14 are likewise suitable. For example, pivot hinges, such as those typically found in contemporary compact disc storage containers, are likewise suitable for attaching the upper housing section 12 to the lower housing section 14.

First 17a and second 17b clips facilitate removable attachment of a cover, pamphlet, brochure, booklet or the like to the upper housing section 12. The upper housing section 12 preferably comprises a transparent window 11 such that either the cover or a front page of the pamphlet, brochure, booklet or the like may be viewed when the disc storage container is closed. When the cover is closed, the first 15 and second 16 living hinges are bent such that the first housing section 12 is laminarly juxtaposed to and generally parallel with the lower housing section 14.

The upper housing section 12 comprises an upper housing flange 20 and the lower housing section 14 similarly comprises a lower housing flange 19. The upper housing flange 20 and the lower housing flange 19 cooperate when the disc storage container is closed to define side walls therefor.

The housing 10 is preferably injection molded as an integrally formed unit, preferably of a transparent or clear polymer material, such as polypropylene. Alternatively, the upper housing section may be formed separately from the lower housing section and then attached thereto during assembly via attachment means such as pivot hinges.

Upper housing latches 21a and 21b cooperate with lower housing latches 22a and 22b, respectively, to openably latch the housing 10 in a closed configuration thereof. Upper housing latches 21a and 21b preferably define detents which engage complimentary detents defined by lower housing latches 22a and 22b according to well-known principles.

The hinge panel 13 preferably comprises a reinforcing rib 23 to enhance the structural strength thereof. Similarly, the lower housing flange 19 preferably comprises ribs 24a–24h to enhance the structural strength of the lower housing flange 19. The ribs 24a–24h of the lower housing flange 19 may further function as stops so as to define the desired position of the tray 25, as discussed in detail below. Optionally, the upper housing flange 20 likewise comprises such ribs (not shown).

A tray 25 is formed, preferably via injection molding, preferably separately from the housing 10. Alternatively, the tray 25 may be integrally formed with the housing 10.

Figure 2:
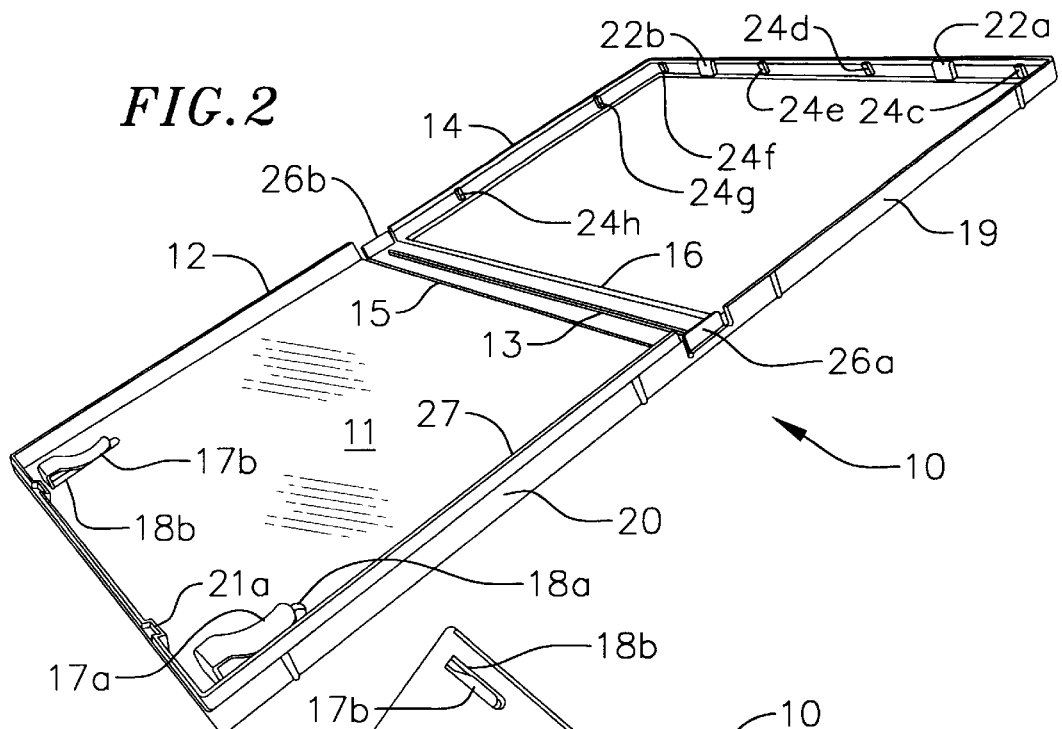
FIG. 2 is a perspective view of the disc storage container of FIG. 1 having the tray removed therefrom and showing inside surfaces thereof.
Figure 3:
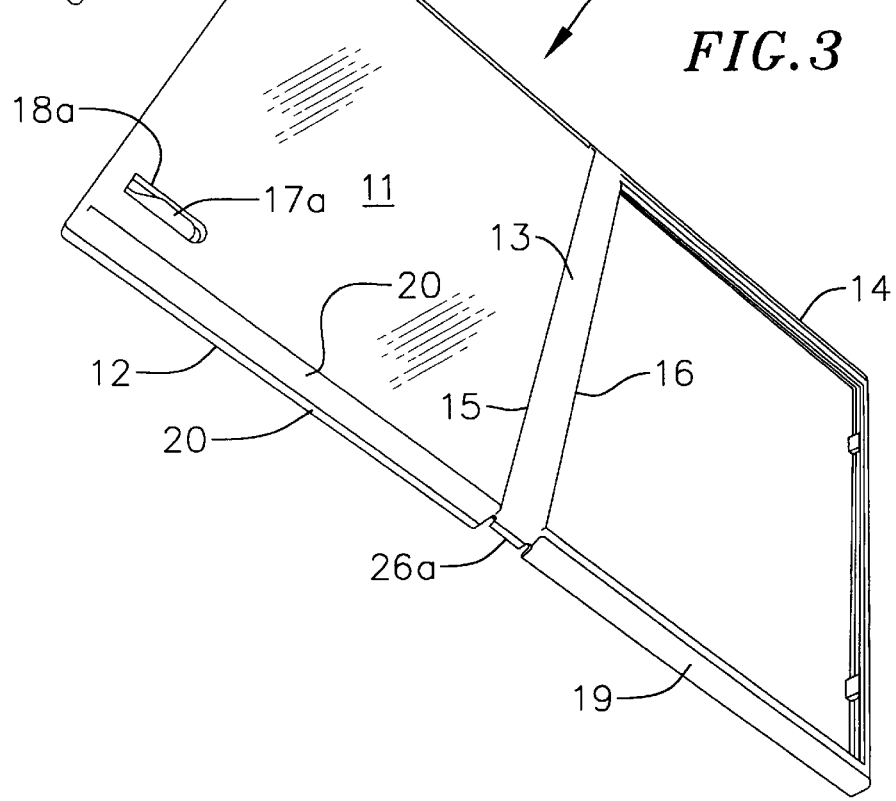
FIG. 3 is a perspective view of the disc storage container of FIG. 1 showing outside surfaces thereof.

According to the preferred embodiment of the present invention, the lower housing section 14 merely comprises lower housing flange 19 (as shown in FIGS. 2 and 3) until the tray 25 is attached thereto. The tray 25 then defines the bottom floor of the lower housing section 14. Alternatively, the lower housing section 14 comprises an integrally formed floor. Thus, the lower housing section 14 may comprise either only a lower housing flange 19 with no floor (as shown in FIGS. 2 and 3), an integrally formed generally planar floor, or an integrally formed tray.

The tray 25 comprises a support ring 36 upon which a disc such as a CD, CD-ROM, CD-R, CD-RW, DVD, DVD-R, DVD-RAM or the like sits. The support ring 36 comprises a seat 35 (best shown in FIGS. 1 and 8) which is configured so as to contact the disc about the unrecorded periphery thereof only. The seat 35 is merely defined as that portion of the support ring 36 which contacts a disc which is installed in the storage container of the present invention. The upper surface of the support ring 36 may optionally be flattened so as to define the seat 35. The tray 25 further comprises a semi-circular stop 38 which limits movement of a stored disc. The semi-circular stop 38 is preferably formed upon the support ring 36 and is preferably segmented, such that the individual segments thereof alternate in position with retainers 34a–34e, which are discussed in detail below.

The tray 25 further comprises a release button 28 formed upon a distal end of an arm 29, such that when the release button is in the uppermost or extended position thereof, a face 32 (best shown in FIG. 7) maintains the disc upon the seat 35 of the support ring 36 by capturing the disc intermediate the retainers 34a–34e, the stop 38, and the button 28, as discussed in detail below.

Referring now to FIGS. 2 and 3, the housing 10 is preferably formed so as to comprise a lower housing section 14 having a lower housing flange 19, but preferably lacking a floor, as discussed above. Thus, the base 37 of the tray 25 forms a floor for the lower housing section 14 when the tray 25 is attached to the lower housing section 14. Reinforcing ribs 24a–24h optionally function as stops so as to define the proper location of the tray 25 with respect to the lower housing flange 19. Thus, during assembly of the disc storage container of the present invention, the tray 25 is inserted into the lower housing flange 19 until the base 37 of the tray 25 abuts the lower surfaces of the reinforcing ribs 24a–24h, which prevents further insertion of the tray 25 into the lower housing flange 19. The tray 25 may be attached to the lower housing flange 19 by any desired means, such as by snap-fit, adhesive bonding, ultrasonic welding, thermal welding, etc.

The hinge panel 13 optionally comprises tabs 26a and 26b which are configured to guide the upper housing flange 20 and lower housing flange 19 into alignment with one another as the disc storage container is closed. Optionally, a lip 27 may be formed about either the upper housing flange 20 or the lower housing flange 19 to further facilitate such alignment.

Figure 4:
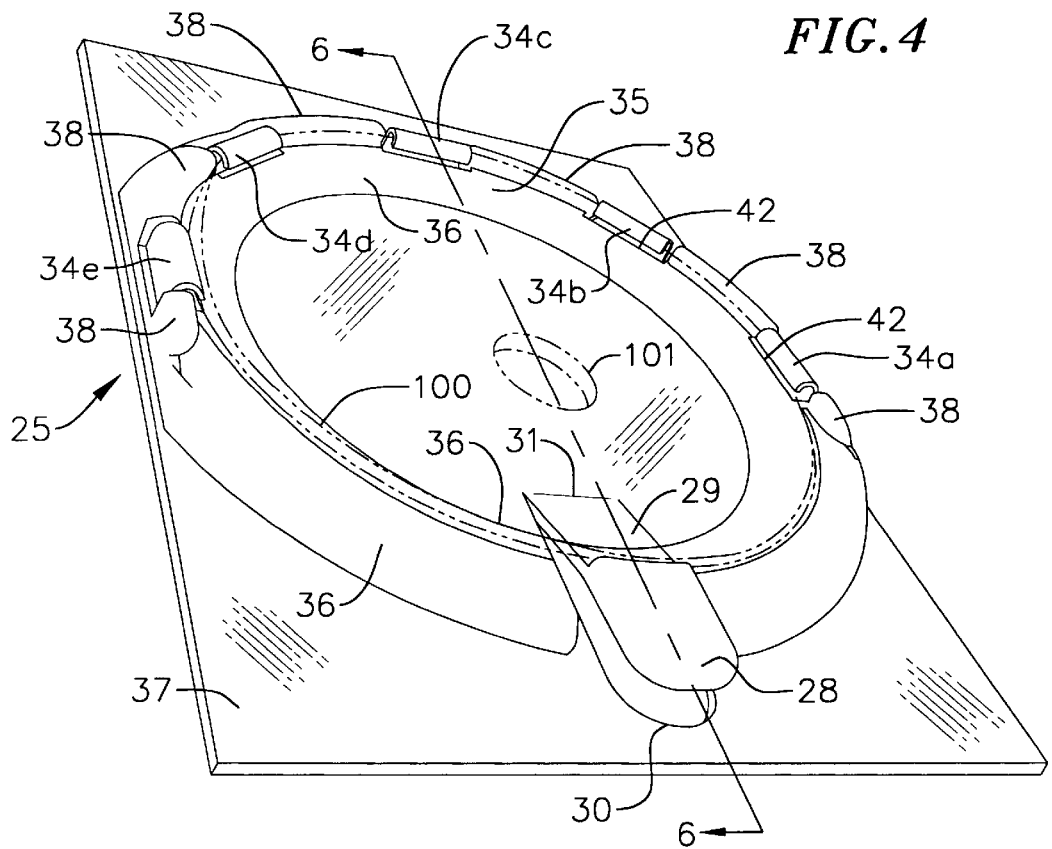
FIG. 4 is a perspective view of the tray of FIG. 1 showing the upper surface thereof and having a disc shown in phantom installed upon the tray.
Figure 5:
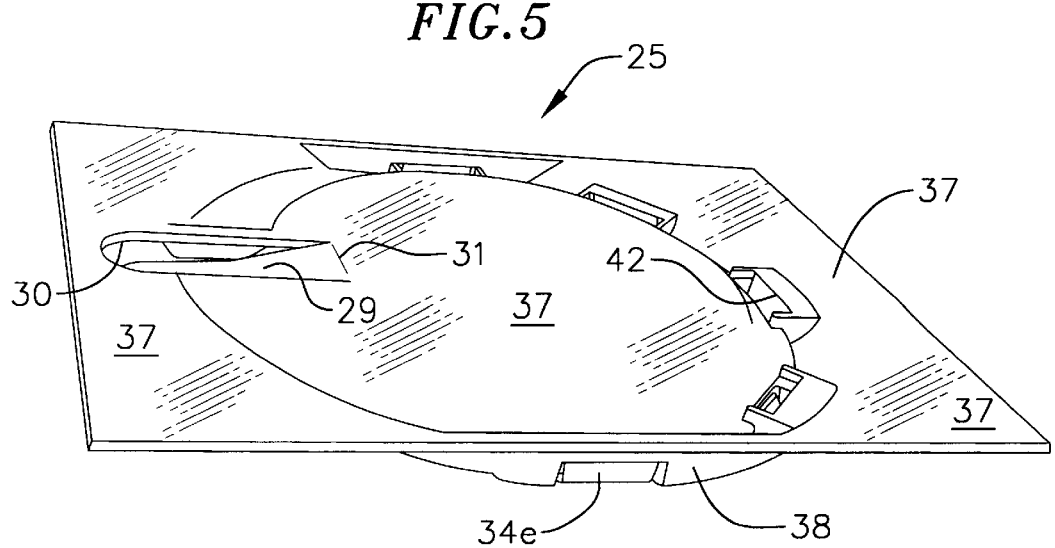
FIG. 5 is a perspective view of the tray of FIG. 1 showing the lower surface thereof.
Figure 6:
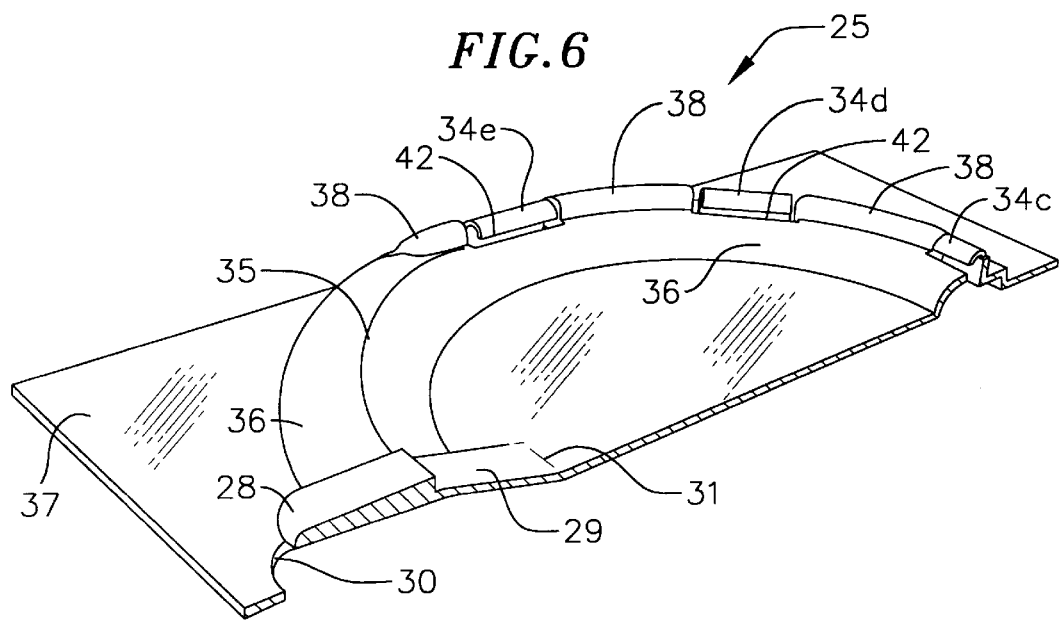
FIG. 6 is a cross-sectional perspective view of the tray of FIG. 4 taken along line 6 thereof.
Figure 7:
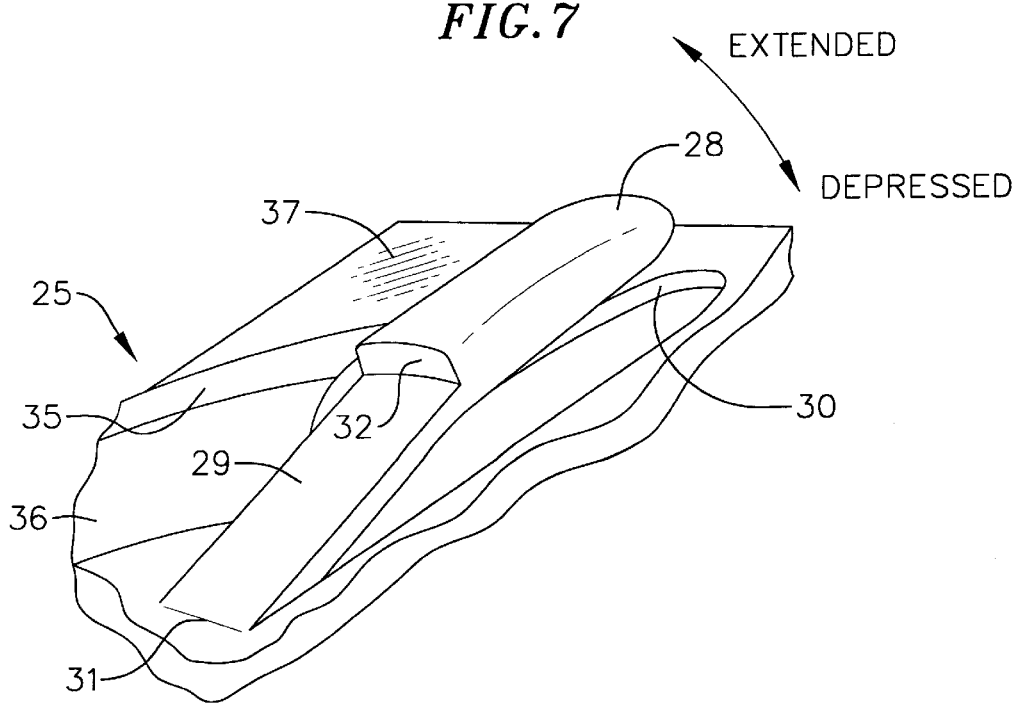
FIG. 7 is an enlarged fragmentary view of the release button and arm of FIG. 1.
Figure 8:
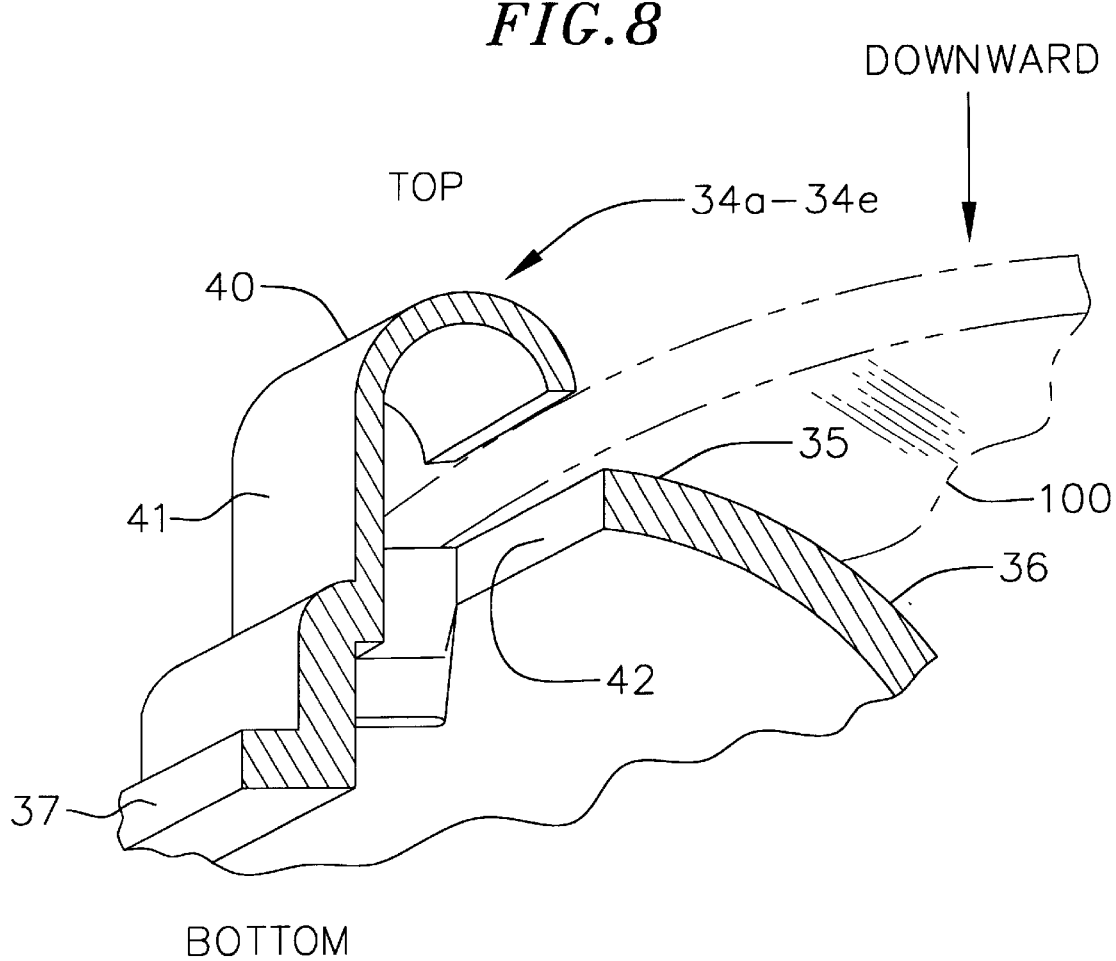
FIG. 8 is a cross-sectional view of an exemplary retainer taken along line 8 of FIG. 9 and having a disc captured between the retainer and the support ring.

Referring to FIGS. 4, 6, and 7 the support ring 36 of the tray 25 preferably comprises a raised portion of the tray 25. The seat 35 preferably comprises an upper portion of the support ring 36 which is configured such that a disc 100 (shown in phantom in FIG. 4) may rest thereon. The retainers 34a–34e preferably extend through openings 42 in the support ring 36 (as best shown in FIGS. 5 and 8).

The arm 29 which has the release button 28 formed upon the distal end thereof is preferably attached to the tray 25 via living hinge 31 which is configured so as to bias the arm 29 and the release button 28 in an upward or extended position thereof, and which is further configured so as to allow depression of the release button 28, such as with a finger, so as to allow the disc to be removed from the tray 25, as discussed in detail below.

According to the preferred embodiment of the present invention, the semi-circular stop 38 is segmented such that it comprises a plurality of segments thereof formed around a portion of the support ring 36 such that a disc may readily be inserted upon the seat 35 of the support ring 36 and removed therefrom only when the release button 28 is in the depressed position thereof. The retainers 34a–34e cooperate with the semi-circular stop 38 and the release button 28 to maintain the disc 100 upon the tray 25 by limiting upward movement of the disc 100 disposed upon the seat 35.

Referring now to FIG. 5, the arm 29 and the release button 28 are preferably formed proximate a complimentary opening 30 of the base 37 of the tray 25, so as to facilitate injection molding of the tray 25. Similarly, the retainers 34a–34e are formed proximate openings 42 to facilitate injection molding.

Forming the release button 28 proximate the complimentary opening 30 and forming the retainers 34a–34e proximate the complimentary openings 42 also facilitates fabrication of the tray 25 via vacuum forming, if desired.

Figure 9:
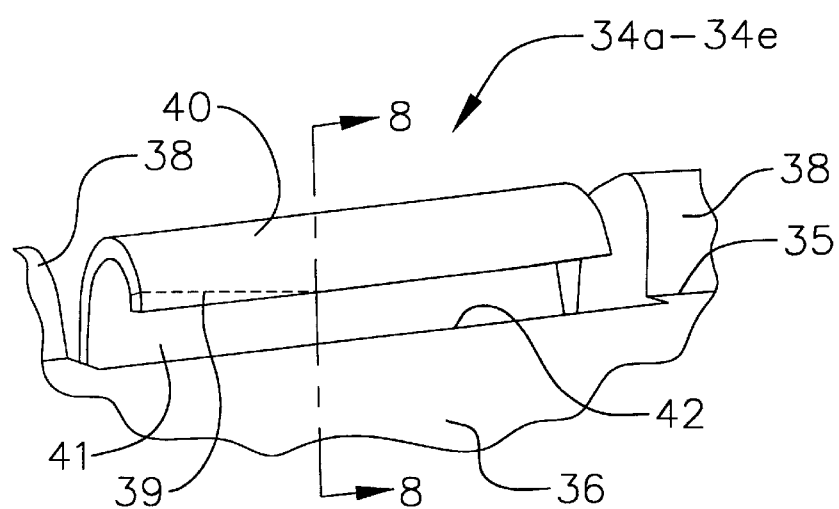
FIG. 9 is an enlarged fragmentary view of an exemplary retainer of FIG. 1.

Referring now to FIGS. 8 and 9, each retainer 34a–34e is preferably generally configured as an inverted U-shaped member which extends upwardly from the base 37 of the tray 25. Thus, each retainer 34a–34e preferably comprises a retainer base 41 and a curved top 40. The retainer base 41 and the curved top 40 cooperate to facilitate deformation of each retainer 34a–34e during insertion of the disc 100 from above, as may be effected during machine loading of the disc storage container, as discussed in detail below.

Optionally, a taper or bevel 39 is formed upon the disc contacting lower surface of the top 40 of the two retainers 34a and 34e which are closest to the release button 28. The bevel 39 is formed upon that end of each retainer 34a and 34e which is closest to the release button 28. As shown in FIG. 9, the bevel 39 is positioned as it would be formed upon retainer 34e. The corresponding bevel for retainer 34a would be formed upon the opposite end of the retainer 34e from that shown in FIG. 9 (and thus be a mirror image of the retainer of FIG. 9). The bevels 39 provide a slightly larger and tapered opening within which the disc is received by the retainers 34a and 34e, thereby facilitating easier insertion of a disc onto the tray 25. Those skilled in the art will appreciate that those corners of the retainers 34a and 34e which are closest to the release button 28 may alternatively be rounded instead of beveled.

Thus, according to the present invention, a disc storage container is provided which facilitates easy insertion and removal of a disc 100 by a user in a manner which does not result in the application of substantial stresses to the disc. This is particularly important for multi-layered discs which may become delaminated due to the repeated application of such undesirable stresses thereto during the removal of such discs from contemporary storage containers.

As discussed above, the removal of the disc 100 from a contemporary storage container typically results in undesirable bending of the disc 100 in a manner which may cause such delamination.

To store a disc in the disc storage container of the present invention, the user merely depresses the release button 28 and slides the disc 100 sideways over the top of the release button 28 such that it engages and abuts stop 38 and is retained by retainers 34a–34e. Once the disc 100 is centered upon the seat 35, the release button 28 is released such that the release button 28 extends away from the base 37 of the tray 25 so as to capture the disc 100 between the face 32 of the release button 28 and the stop 38.

To remove the disc 100, the release button 28 is merely depressed with a finger, preferably sufficiently to allow a portion of a finger, e.g., the tip, to reach under the disc 100, thereby allowing the disc to be grasped and pulled from the tray 25. A finger may be placed within the center opening 101 (FIG. 4) of the disc 100 to aid in such installation within and removal from the disc storage container of the present invention, if desired.

It is important to note that as the release button 28 is depressed during removal of the disc 100 from the disc storage container of the present invention, the geometry of the arm 29 with respect to the tray 25 and with respect to the disc 100 causes the face 32 of the release button 28 to move away from the disc without substantially frictionally engaging, e.g., scratching, scraping, abrading, or otherwise undesirably contacting the disc. Similarly, when the disc 100 is installed in the disc storage container of the present invention and the button rises to its extended position, the face 32 of the release button 28 does not substantially frictionally engage the disc. Rather, the face 32 of the release button 28 simply moves closer to the periphery of the disc, rather than rubbing substantially thereagainst. Thus, the introduction of undesirable stress to the disc, as well as the application of undesirable friction thereto, are both mitigated.

The arm 29 is configured such that it may be depressed sufficiently to effect removal of the disc 100, even when the disc container is laid upon a flat surface, such as a table top.

An important advantage of the present invention is that it facilitates automated, i.e., machine, loading of a disc therein. By configuring the retainers 34a–34e such that they deform or bend outwardly when a disc is urged onto the tray 25 from above, automation of the disc loading process is facilitated.

The retainers 34a–34e are configured so as to facilitate such deformation or bending thereof. Both the curved top 40 and the elongated base 41 of each retainer 34a–34e is capable of bending substantially during the installation of a disc from above. Thus, as the disc is urged downwardly (as shown in FIG. 8) toward the tray 25, the periphery of the disc contacts the curved upper portion 40 of each retainer 34a–34e, so as to cause each retainer 34a–34e to bend outwardly. Once the disc is lowered toward the tray 25 to the point where it no longer engages the top 40 of each retainer 34a–34e, then each retainer 34a–34e snaps or bends back to its original position so as to capture the disc, at the unrecorded periphery thereof, intermediate the top 40 of each retainer 34a–34e and the seat 35 of the support ring 36. Thus, only the unrecorded periphery of the disc contacts the retainers 34a–34e as the disc is forced downwardly therepast.]

As such, the disc storage container of the present invention may be machine loaded by, for example, using a vacuum gripper to pick up a disc and to push the disc downwardly upon the tray 25, thereby deforming the retainers 34a–34e such that the disc snaps therepast. Preferably, the vacuum gripper (or any other disc handling device) supports the disc about the periphery thereof, at least along those portions of the periphery where the disc pushes against the retainers 34a–34e as the disc is placed upon the tray 25.

Once installed upon the tray 25, the disc only contacts the tray about an unrecorded portion, i.e., the periphery, thereof, which rests upon the seat 35. The tops 40 of the retainers 34a–34e prevent the window 11 from being deformed or pressed downwardly against the disc, as might otherwise undesirably occur during handling, shipping, or storage thereof. Thus, according to the present invention, the disc is stored in a manner which mitigates undesirable contact therewith which may result in damage to the disc.

Further, the disc is inserted into and removed from the disc storage container of the present invention in a manner which mitigates the application of undesirable stresses thereto which may result in damage, e.g., delamination.

Thus, according to the present invention, a disc can be inserted into the tray 25 from above, such as during packaging of the disc by the disc manufacturer or producer. The disc can also be slid into and out of the tray 25 from one side thereof.

It is understood that the exemplary disc storage container described herein and shown in the drawings represents only a presently preferred embodiment of the invention. Indeed, various modifications and additions may be made to such embodiment without departing from the spirit and scope of the invention. For example, the support ring 36 and/or the seat 35 need not be generally continuous. Rather, the support ring 36 and/or the seat 35 need only comprise sufficient structure so as to adequately support the disc. Thus, the support ring 36 and/or the seat 35 may alternatively comprise a series of separate, individual, segmented supports, bosses, or posts.

Thus, these and other modifications and additions may be obvious to those skilled in the art and may be implemented to adapt the present invention for use in a variety of different applications.

What is claimed is:

1. A storage container for discs, the storage container comprising:
    a tray configured to receive a disc;
    a plurality of retainers formed at a location on the tray so as to extend over a peripheral portion of the disc when the disc is in the tray, wherein said retainers are configured to bend out of the way when a disc is inserted into the tray from above;
    wherein the tray and the retainers are configured to cooperate to facilitate insertion and removal of a disc from a side of the tray; and
    wherein the retainers are configured to facilitate insertion of the disc onto the tray from above.

2. The storage container as recited in claim 1, wherein the retainers are disposed so as to generally define a semicircle about a disc disposed upon the tray.

3. The storage container as recited in claim 1, wherein the retainers are configured to deform when a disc is inserted onto the tray from above.

4. The storage container as recited in claim 1, wherein the retainers generally define inverted U-shaped members extending from the tray.

5. The storage container as recited in claim 1, wherein the retainers are configured to contact the disc only at an unrecorded portion thereof.

6. The storage container as recited in claim 1, wherein the retainers are formed integrally with the tray.

7. The storage container as recited in claim 1, wherein the tray comprises a seat configured to support the disc only at an unrecorded portion thereof.

8. The storage container as recited in claim 1, wherein said tray comprises a release button configured to cooperate with the retainers to capture a disc.

9. The storage container as recited in claim 1, further comprising a release button integrally formed with the tray and configured to cooperate with the retainers to capture the disc.

10. The storage container as recited in claim 1, further comprising a release button integrally formed with the tray and configured to cooperate with the retainers so as to mitigate stress induced in the disc during removal of the disc from the storage container.

11. The storage container as recited in claim 1, further comprising a cover attached to the tray.

12. The storage container as recited in claim 1, further comprising a cover hingedly attached to the tray.

13. The storage container as recited in claim 1, further comprising a transparent cover attached to the tray.

14. A storage container for discs, the storage container comprising:
    a tray configured to receive a disc; and
    a button configured to move with respect to the tray, the button inhibiting removal of a disc from a periphery of the tray when the button is extended and the button enabling sliding removal of the disc from the periphery of the tray when the button is depressed, the button being on the end of an arm which is hingedly connected to the tray and which extends away from the center of the tray and upwardly from the plane of the tray to thereby allow depression of the button and the arm when the container is on a flat surface.

15. The storage container as recited in claim 14, wherein the button is configured to move away from the disc when the button is depressed, so as to mitigate undesirable abrasion of the disc by the button.

16. A storage container for discs, the storage container comprising:
    a tray configured to receive a disc thereon from a periphery thereof;
    a plurality of upwardly extending retainers formed upon the tray so as to inhibit upward movement of the disc while facilitating sideways movement of the disc; and a lever having a button formed upon a distal end thereof, a proximal end of the lever being attached to the tray by a living hinge, the button being configured to inhibit removal of a disc from the periphery of the tray when in an extended position thereof and being configured to enable sliding removal of the disc from the periphery of the tray when in a depressed position thereof, said lever extending away from the center of the tray and upwardly from the plane of the tray.

17. The storage container as recited in claim 16, wherein said upwardly extending retainers are at a location on the tray so as to extend over a peripheral portion of the disc when the disc is in the tray.

18. The storage container as recited in claim 16, wherein the retainers are configured to deform when a disc is inserted onto the tray from directly above the tray.

19. The storage container as recited in claim 16, wherein the retainers are configured to bend out of the way of a disc when such a disc is inserted onto the tray from above the tray.

20. The storage container as recited in claim 16, wherein the retainers generally define inverted U-shaped members extending from the tray.

* * * * *